United States Patent
Imao et al.

[19]

[11] Patent Number: 6,062,097
[45] Date of Patent: May 16, 2000

[54] AUTOMATIC SPEED-CHANGE APPARATUS FOR A GEAR TRANSMISSION

[75] Inventors: Toshio Imao; Eiji Takeyama, both of Nagoya, Japan

[73] Assignee: Aichi Kikai Kogyo Kabushiki Kaisha, Nagoya, Japan

[21] Appl. No.: 09/222,758

[22] Filed: Dec. 30, 1998

[30] Foreign Application Priority Data

Jan. 12, 1998 [JP] Japan .................................. 10-018154

[51] Int. Cl.$^7$ ........................... B60K 17/04; F16H 59/00
[52] U.S. Cl. .......................................... 74/473.12; 74/335
[58] Field of Search ................................ 74/473.12, 335

[56] References Cited

U.S. PATENT DOCUMENTS

| | | | |
|---|---|---|---|
| 2,171,715 | 9/1939 | Sinclair | 74/335 X |
| 3,145,577 | 8/1964 | Bullard, III et al. | 74/335 |
| 4,745,822 | 5/1988 | Trachman et al. | 74/473.12 X |
| 5,180,959 | 1/1993 | Christopher | 74/473.12 X |
| 5,970,811 | 10/1999 | Imao et al. | 74/335 |
| 6,003,395 | 12/1999 | Rogg et al. | 74/335 |

FOREIGN PATENT DOCUMENTS

| | | |
|---|---|---|
| 29 622669 | 5/1997 | Germany . |
| 6151497 | 5/1980 | Japan . |
| 2 207715 | 2/1989 | United Kingdom . |
| 2 318395 | 4/1998 | United Kingdom . |

*Primary Examiner*—Charles A. Marmor
*Assistant Examiner*—Roger Pang
*Attorney, Agent, or Firm*—Dennison, Scheiner, Schultz & Wakeman

[57] ABSTRACT

The object is to provide a compact speed-change apparatus for performing the automatic gear shifting of the conventional gear transmission.

In this apparatus the select mechanism comprises a select motor 2 rotatable forward and backward, gears 4, 6 for transmitting the rotation of the select motor 2, and a select-shift sleeve 7 receiving the rotation and one end of which is connected with a select-shift rod 9 of the gear transmission; and the shift mechanism comprises a shift motor 10, a gear 12 to be rotated by the shift motor 10, a swing gear 13 meshing with the gear 12 and swinging on an intermediate shaft 14 as a fulcrum, and a connecting rod 16 one end of which is connected with the swing gear 13 and the other end of which is connected with said select-shift sleeve 7.

2 Claims, 4 Drawing Sheets

SHIFT PATTERN

AUTOMATIC SPEED-CHANGE APPARATUS FOR A GEAR TRANSMISSION

BACKGROUND OF THE INVENTION

1. Field of the Invention

The present invention relates to an automatic speed-change apparatus for a gear transmission.

2. Description of the Prior Art

In the prior art, there has been developed an apparatus in which the mechanism for a manual gear transmission is used as it is and the speed change operation is automated through a hydraulic apparatus by a computer control. However, it requires three cylinders for clutching, shifting and selecting, and a number of solenoid valves to actuate these cylinders, so that it has such problems as complicated structure, large size and high cost.

Also, a speed-change apparatus in which motors are used as actuators to select or shift the gear transmission has been disclosed in JP publication Toku-ko-sho 61-51497, for example. However, this apparatus requires certain numbers of motors depending on the numbers of the select lines, and because of using a plurality of motors or solenoids, it results in a complicated structure and large size apparatus and further in high cost.

SUMMARY OF THE INVENTION

Accordingly, the present invention has been developed in order to solve the above problems in the prior art, and an object of the invention is to provide a small-sized automatic speed-change apparatus which can perform automatic gear shifting of the conventional gear transmission.

Another object of the present invention is to provide an automatic speed-change apparatus which can perform automatic select and shift operation of the gear transmission smoothly by a compact structure.

The preceeding objects are accomplished in an automatic speed-change apparatus for a gear transmission having a select-shift rod extended out thereof; said automatic speed-change apparatus connected with said select-shift rod for performing automatic shift operation of said gear transmission by converting driving force of motors into the rotational and the axial movement of said select-shift rod to transmit the movement to the shift fork of the transmission; said automatic speed-change apparatus provided with a select mechanism for performing the select operation and a shift mechanism for performing the shift operation; said select mechanism comprising a select motor rotatable forward and backward and controllable for a designated angle of rotation, gears for transmitting the rotation of said select motor, a select-shift sleeve receiving the rotation and one end of said sleeve connected with said select-shift rod; and said shift mechanism comprising a shift motor controllable for forward and backward rotation, a gear to be rotated by said shift motor, a swing gear meshing with said gear and swinging on an intermediate shaft as a fulcrum, and a connecting rod connected at one end with said swing gear and at the other end with said select-shift sleeve.

DESCRIPTION OF THE PREFERRED EMBODIMENT

With reference to the accompanying drawings, a preferred embodiment of the present invention will be described hereinafter.

Figure 1:
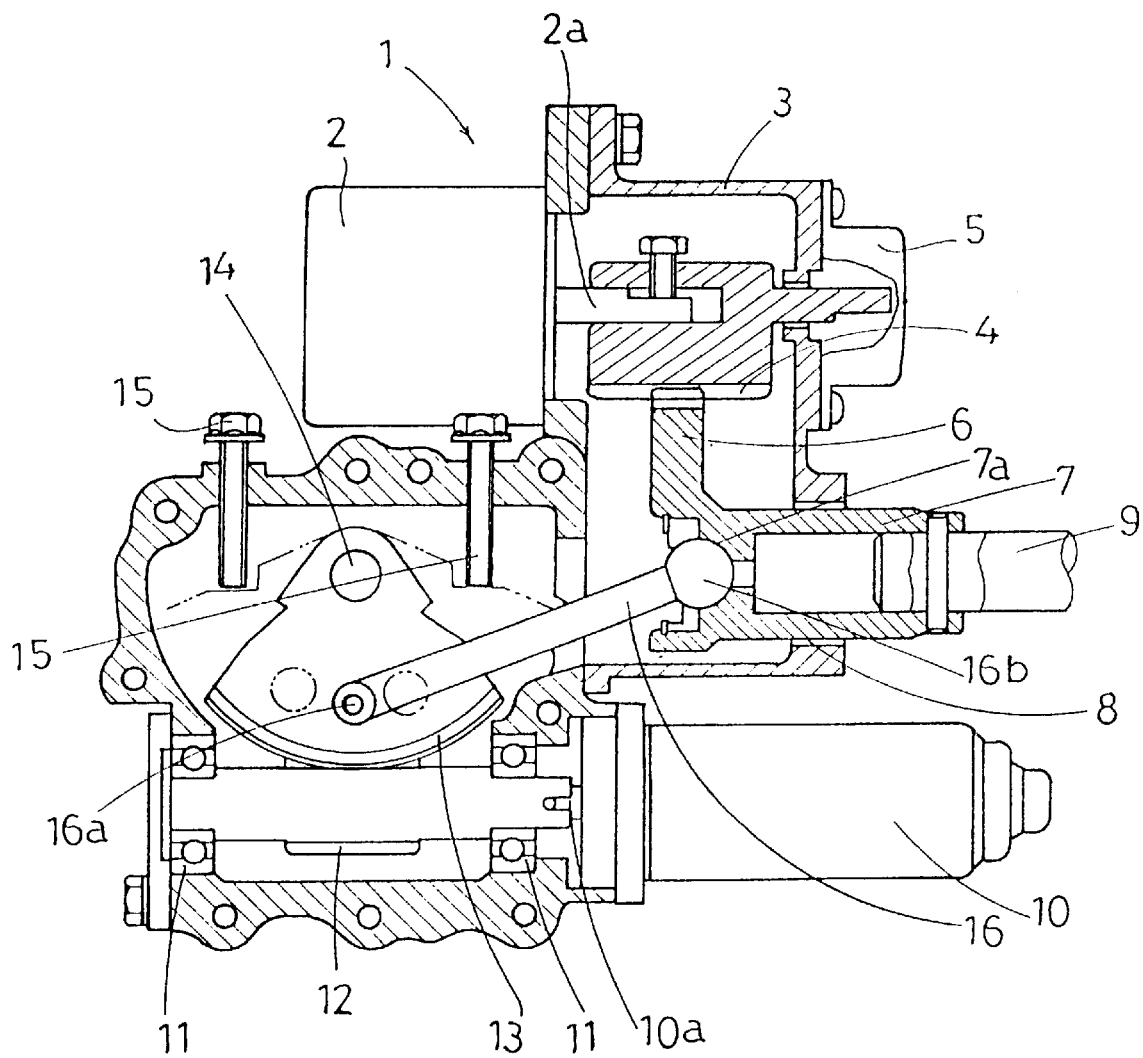
FIG. 1 is a sectional view of an automatic speed-change apparatus as first embodiment of the invention.

FIG. 1 is a sectional view of an automatic speed-change apparatus as first embodiment of the invention. The automatic speed-change apparatus 1 is provided with a select motor 2 which is ratatable forward and backward and controllable for a designated angle of rotation. In a housing 3 is disposed a sectorial select drive gear 4 secured to a motor shaft 2a of the select motor 2. To the right end of this select drive gear 4 is fitted a select sensor 5 for detecting angles of rotation of the select motor 2.

This select drive gear 4 has a long gear tooth portion in the axial direction, with which is meshed a sectorial select driven gear 6. The select driven gear 6 is formed integrally with a select-shift sleeve 7. The select-shift sleeve 7 is rotatable in a bearing 8 on the housing 3 and movable in the axial direction. At the left end of this select-shift sleeve 7, as shown in the drawing, is formed a spherical hollow portion 7a in concavity. The other end of the sleeve 7 is projected out of the housing 3 and connected with a select-shift rod 9 extended out of the gear transmission (not shown). The select motor 2, select drive gear 4, select driven gear 6, select-shift sleeve 7, and select sensor 5 constitute a select mechanism.

In the lower portion of the housing 3 is disposed a shift motor 10 rotatable forward and backward, with a motor shaft 10a of which is fixedly connected a worm gear 12 rotatablly supported at both ends through bearings 11, 11. This worm gear 12 is meshed with a worm wheel 13 formed in a sectorial shape. The worm wheel 13 is capable of swinging on an intermediate shaft 14 as a fulcrum and stoppers 15, 15 for controlling the range of swinging are fitted to the housing 3.

A first joint member 16a in one end of a connecting rod 16 is connected with the worm wheel 13 at a point of the peripheral portion distant from the intermediate shaft 14. In the other end of the connecting rod 16 is provided a second joint member 16b formed in sphere. The second joint member 16b is rotatably joined in the hollow portion 7a of the select-shift sleeve 7.

The shift motor 10, worm gear 12, worm wheel 13, connecting rod 16, select-shift sleeve 7 constitute a shift mechanism, in which is provided a stroke sensor (not shown) for detecting an amount of axial movement of the select-shift sleeve 7.

Figure 3:
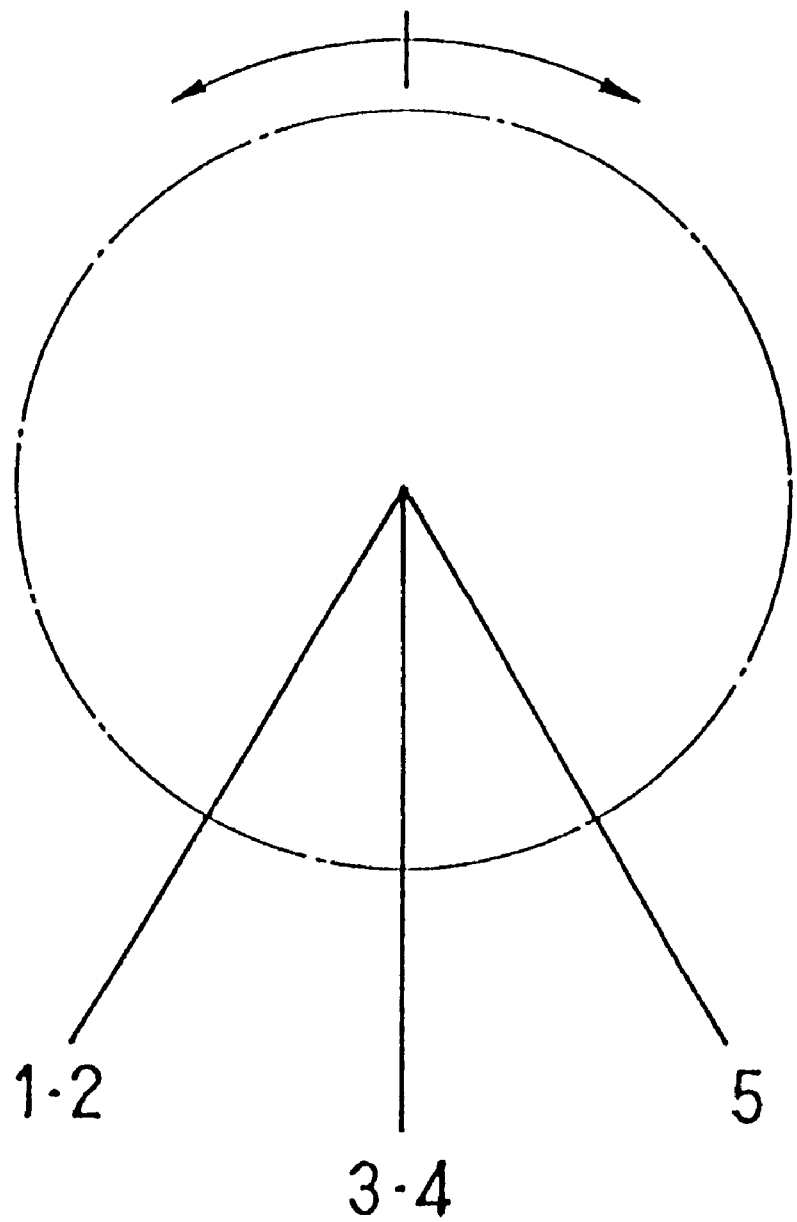
FIG. 3 is an illustration of select operation.

Incidentally, in the gear transmission, by rotating the extended select-shift rod 9 on its axis, a shifting line is selected within the gear transmission, as shown in a diagram of the select operation of FIG. 3. As shown in FIG. 3, by rotating the select-shift rod 9 clockwise on its axis the low or the second speed position can be selected, and also by rotating it counterclockwise the fifth speed position can be selected, and by putting it on the center shifting line the third or the fourth speed position can be selected.

Figure 4:
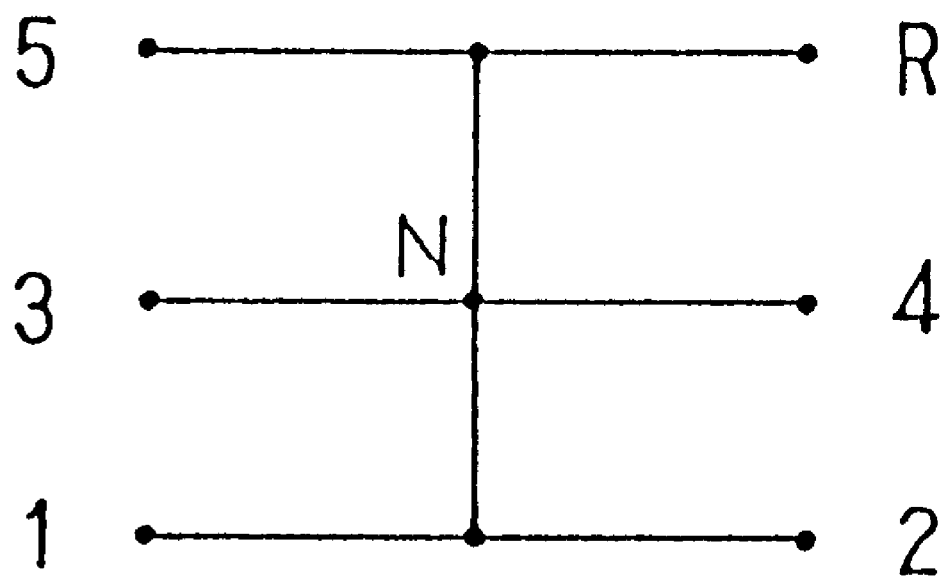
FIG. 4 is a shift pattern diagram.

After a shifting line in the transmission is selected as described above, by moving the select-shift rod 9 in the axial direction, the shift fork in the transmission is subsequently moved, and the innner gear is shifted in the required low or second position, for example, as shown in a diagram of the shift pattern of FIG. 4. Thus, the speed-change operation can be completed.

In the constitution of the above-described automatic speed-change apparatus 1, when the shift motor 10 is in the rest condition and the select motor 2 is operated, the rotating force is transmitted from the select drive gear 4 to the select driven gear 6 to rotate the select-shift sleeve 7 on the axis. Thereby, the select-shift rod 9 of the gear transmission, connected with the sleeve 7, is rotated on the axis to perform the select operation. And thereafter, when the select motor 2 is in the rest condition and the shift motor 10 is operated, the worm gear 12 is rotated, the rotation speed is decreased through the worm wheel 13, and the worm wheel 13 performs swing motion on the intermediate shaft as a fulcrum. Thereby, the connecting rod 16 is axially moved interlocking with the swing motion. As a result, the select-shift sleeve 7 is axially moved and the select-shift rod 9 is also axially moved to perform the shift operation. During such a select and a shift operation, the select motor 2 and the shift motor 10 are exactly controlled through the select sensor 5 and the stroke sensor (not shown).

In this embodiment, since the rotation of the shift motor 10 is decreased by the worm gear 12 and worm wheel 13, a large load in the shifting direction can be obtained even when the shift motor 10 is a small type of capacity.

Further, with regard to the connecting rod 16 and select-shift sleeve 7, the second joint member 16b is connected in the spherical hollow portion 7a, that is, connected by a spherical bearing, so that the select-shift sleeve 7 can move smoothly in the axial direction and can rotate smoothly on the axis.

Incidentally, instead of the spherical bearing structure of the spherical hollow portion 7a and second joint member 16b, the connecting rod 16 and select-shift sleeve 7 may be connected by a universal joint.

Further, even in the connecting portion of the firsr joint member 16a and worm wheel 13, adoption of a spherical bearing structure or a universal joint can obtain a smooth operating condition.

Figure 2:
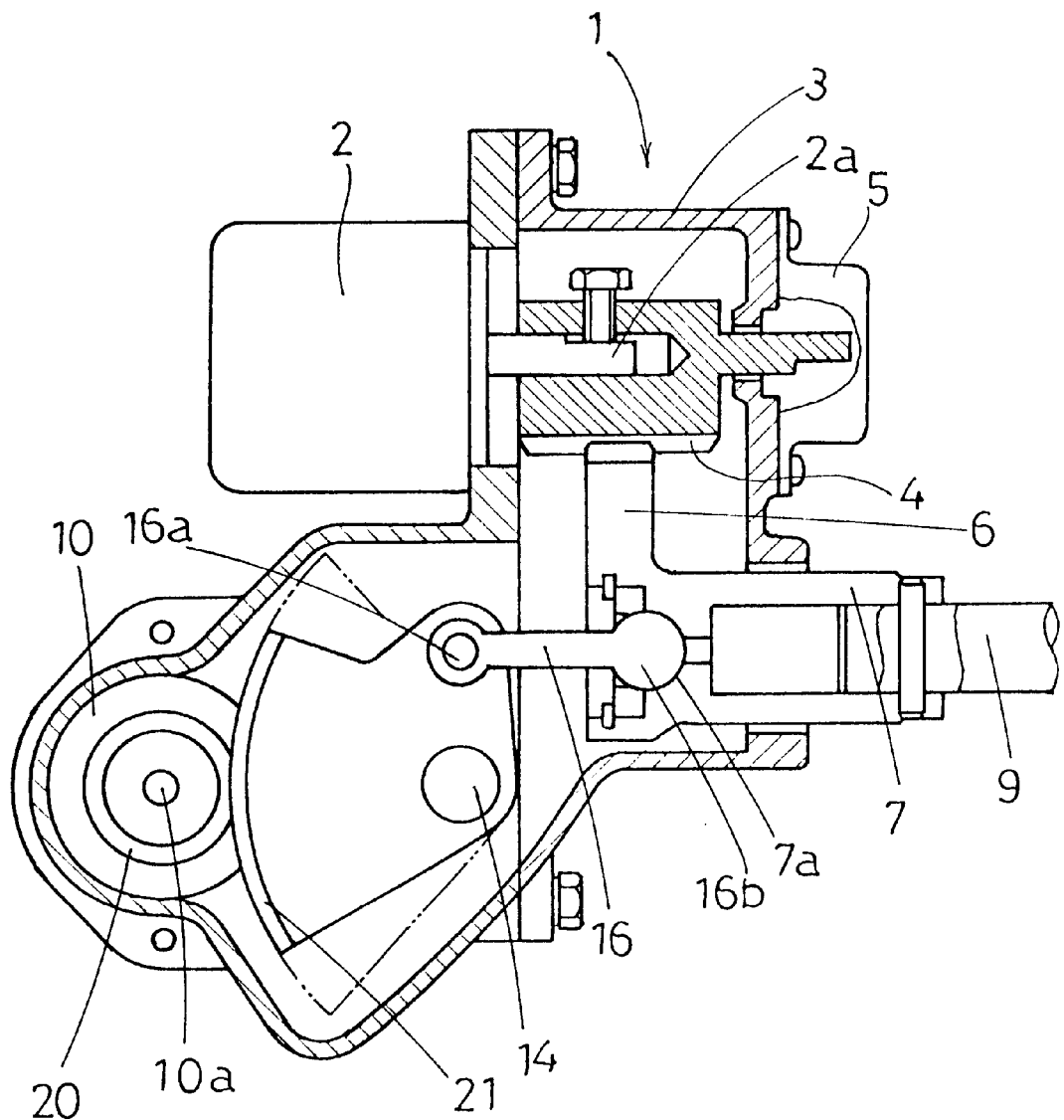
FIG. 2 is a sectional view of an automatic speed-change apparatus as second embodiment of the invention.

Next, FIG. 2 shows second embodiment, in which the same elements as in first embodiment are given the same reference characters to describe them.

In this embodiment, although the select mechanism is the same as that in first embodiment, the shift mechanism uses a pinion gear 20, which is composed of a spur gear or a bevel gear. Further, in the shift mechanism is used a sectorial wheel gear 21 meshing with the pinion gear 20 and swinging on the intermediate shaft 14 as a fulcrum. This sectorial wheel gear 21 has a flat tooth portion meshing with flat teeth when the pinion gear 20 is composed of a spur gear, or the wheel gear 21 has a bevel tooth portion meshing with bevel teeth when the pinion gear 20 is composed of a bevel gear.

The first joint member 16a of the connecting rod 16 is joined with a point of this sectorial wheel gear 21 distant from the intermediate shaft 14. The spherical bearing 16b in the other end of the connecting rod 16 is connected in the spherical hollow portion 7a of the select-shift sleeve 7.

In the constitution of the second embodiment are used a pinion gear 20 and a sectorial wheel gear 21, so that the endurance and the reliability are enhanced.

Indidentally, the function of this second embodiment is similar to that of the first embodiment; that is, according to the rotation of the select motor 2 the select-shift sleeve 7 is rotated on the axis. Also, according to the rotation of the shift motor 10 the select-shift sleeve 7 is moved in the axial direction through the pinion gear 20 and sectorial wheel gear 21 for decreasing the rotation and further through the interposed connecting rod 16.

What is claimed is:

1. An automatic speed-change apparatus for a gear transmission having a select-shift rod extended out thereof;

said automatic speed-change apparatus connected with said select-shift rod for performing automatic shift operation of said gear transmission by converting driving force of motors into the rotational and the axial movement of said select-shift rod to transmit the movement to the shift fork of the transmission;

said automatic speed-change apparatus provided with a select mechanism for performing the select operation and a shift mechanism for performing the shift operation;

said select mechanism comprising a select motor rotatable forward and backward and controllable for a designated angle of rotation, gears for transmitting the rotation of said select motor comprising a select drive gear on the side of the select motor and a sectorial select driven gear formed integrally with a select shift sleeve, the select drive gear having a long gear tooth portion in the axial direction and being meshed with the select driven gear, a rotatable and axially movable select-shift sleeve having a first end and a second end, receiving the rotation and having a spherical hollow portion formed on said first end and said second end being connected coaxially with said select-shift rod; and said shift mechanism comprising a shift motor controllable for forward an backward rotation, a worm gear to be rotated by said shift motor, a swing gear comprising a sectorial worm wheel gear meshing with said worm gear and swinging on an intermediate shaft as a fulcrum, stoppers for controlling the swinging range of the sectorial worm wheel gear, and a connecting rod having a first end and a second end, said first end being connected with said swing gear at a peripheral portion of said swing gear by a first point member and said second end comprising a second joint member having a spherical shape and connected to said spherical hollow portion of said select-shift sleeve.

2. An automatic speed-change apparatus as defined in claim 1, wherein the axes of the select motor, the select shift sleeve, the shift motor and the worm gear extend in parallel with each other.

* * * * *